United States Patent
Anderson et al.

(10) Patent No.: US 9,347,487 B2
(45) Date of Patent: May 24, 2016

(54) ROTORCRAFT BEARING WITH ROTATION SLIP JOINT

(71) Applicant: Bell Helicopter Textron Inc., Fort Worth, TX (US)

(72) Inventors: Adam Anderson, Fort Worth, TX (US); Frank Bradley Stamps, Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 14/291,353

(22) Filed: May 30, 2014

(65) Prior Publication Data
US 2015/0345551 A1    Dec. 3, 2015

(51) Int. Cl.
*F16C 27/06* (2006.01)
*B64C 27/35* (2006.01)

(52) U.S. Cl.
CPC ............. *F16C 27/063* (2013.01); *B64C 27/35* (2013.01)

(58) Field of Classification Search
CPC ...... F16C 23/043; F16C 23/048; F16C 27/02; F16C 17/04; F16C 33/06-33/1095; F16C 2326/43; F16C 2208/10; F16C 11/08; F16C 11/083; F16C 11/086; F16C 27/06; F16C 27/063; F16C 27/08; B64C 27/41; B64C 27/39; B64C 27/33; B64C 27/32; B64C 27/35
See application file for complete search history.

(56) References Cited

U.S. PATENT DOCUMENTS

| | | | | |
|---|---|---|---|---|
| 1,121,083 A | * | 12/1914 | De Ferranti | 384/304 |
| 1,845,789 A | * | 2/1932 | Gilson | 384/368 |
| 3,782,854 A | * | 1/1974 | Rybicki | 416/134 R |
| 3,829,239 A | * | 8/1974 | Rybicki et al. | 416/134 R |
| 3,862,812 A | * | 1/1975 | Gorndt et al. | 416/141 |
| 4,008,980 A | * | 2/1977 | Noehren et al. | 416/134 A |
| 4,141,664 A | * | 2/1979 | Moran et al. | 403/53 |
| 4,142,833 A | * | 3/1979 | Rybicki et al. | 416/134 A |
| 4,236,737 A | * | 12/1980 | Herbert et al. | 285/234 |
| 4,251,187 A | * | 2/1981 | Hollrock | 416/134 A |
| 4,257,739 A | * | 3/1981 | Covington et al. | 416/134 A |
| 4,264,277 A | * | 4/1981 | McCafferty | 416/134 A |
| 4,395,142 A | * | 7/1983 | Lobeck | 384/192 |
| 4,477,225 A | * | 10/1984 | Burkam | 416/134 A |
| 4,504,193 A | * | 3/1985 | Mouille | 416/140 |
| 4,516,909 A | * | 5/1985 | Caramaschi et al. | 416/134 A |
| 5,156,527 A | * | 10/1992 | Pancotti | 416/131 |
| 6,287,076 B1 | * | 9/2001 | Mouille | 416/134 A |
| 6,666,648 B2 | * | 12/2003 | Bernhard et al. | 416/23 |
| 6,971,853 B2 | * | 12/2005 | Chemouni et al. | 416/134 A |
| 8,695,918 B2 | * | 4/2014 | Jarrett et al. | 244/17.11 |

(Continued)

FOREIGN PATENT DOCUMENTS

WO    2008/048206    4/2008

*Primary Examiner* — Alan B Waits
(74) *Attorney, Agent, or Firm* — Fish & Richardson P.C.

(57) ABSTRACT

On example of a rotorcraft bearing system includes a bearing housing attached to an elastomeric bearing on a longitudinal axis, an end surface of the elastomeric bearing attached to an end surface of the bearing housing. The rotorcraft bearing system also includes a sliding contact bearing having an end surface. The rotorcraft bearing system also includes an intermediate sliding contact bearing material layer. Under load on the longitudinal axis, the end surface of the sliding contact bearing is configured to contact an opposing end surface of the bearing housing through the intermediate sliding contact bearing material layer to form a rotational slip joint.

20 Claims, 6 Drawing Sheets

(56) References Cited

U.S. PATENT DOCUMENTS

| | | | |
|---|---|---|---|
| 8,926,281 B2* | 1/2015 | Stamps et al. | 416/134 A |
| 2011/0243731 A1* | 10/2011 | Meyer et al. | 416/1 |
| 2012/0141052 A1* | 6/2012 | Drew et al. | 384/13 |
| 2012/0257847 A1* | 10/2012 | Allred et al. | 384/221 |
| 2013/0071175 A1* | 3/2013 | Adamczyk et al. | 403/122 |
| 2013/0084186 A1* | 4/2013 | Sottiaux et al. | 416/174 |
| 2013/0202232 A1* | 8/2013 | Mueller et al. | 384/129 |
| 2014/0226926 A1* | 8/2014 | Caruso et al. | 384/125 |

* cited by examiner

ROTORCRAFT BEARING WITH ROTATION SLIP JOINT

TECHNICAL FIELD

This disclosure relates to a bearing assembly for a rotorcraft.

BACKGROUND

In some rotorcraft, the rotor blades are coupled to a yoke that is attached to a rotating mast. The coupling between the blades and the yoke experiences centrifugal forces generated by the rotating blades. The coupling between the blades and the yoke can include a centrifugal force bearing (CF bearing) that allows each blade to pitch while being able to withstand the centrifugal force generated by the rotating blade. The CF bearing also transfers the loads due to centrifugal force from the blade to the yoke. Folding the blades, e.g., tiltrotor aircraft blades, for storage can result in damage to the CF bearing due to torsional loads and/or due to strain.

SUMMARY

This disclosure describes a rotorcraft bearing with rotation slip joint.

Certain aspects of the subject matter described here can be implemented as a rotorcraft bearing system. The rotorcraft bearing system includes a bearing housing attached to an elastomeric bearing on a longitudinal axis, an end surface of the elastomeric bearing attached to an end surface of the bearing housing. The rotorcraft bearing system also includes a sliding contact bearing having an end surface. The rotorcraft bearing system also includes an intermediate sliding contact bearing material layer, wherein, under load on the longitudinal axis, the end surface of the sliding contact bearing is configured to contact an opposing end surface of the bearing housing through the intermediate sliding contact bearing material layer to form a rotational slip joint.

This, and other aspects, can include one or more of the following features. The opposing end surface of the bearing housing can include a polished surface. The intermediate sliding contact bearing material can be attached to the end surface of the sliding contact bearing. The end surface of the sliding contact bearing can include a polished surface. The intermediate sliding contact bearing material can be attached to the opposing end surface of the bearing housing. The sliding contact bearing material can include a frictional material. The sliding contact bearing material can include at least one of tetrafluoroethylene (TFE), PEEK, or brass. The rotorcraft bearing system can include an intermediate polymer layer between the intermediate sliding contact bearing material layer and the elastomeric bearing. The intermediate polymer layer can include rubber. The intermediate polymer layer can be attached to the end surface of the bearing housing. The rotorcraft bearing system can include a retaining member attached to the bearing housing and the sliding contact bearing to prevent the bearing housing and the sliding contact bearing from separating when the load on the longitudinal axis is removed. The retaining member can include a retaining ring and a hook member attached to the retaining ring, the hook member configured to be received by a recess in the bearing housing. The hook member can be formed in the bearing housing. The hook member can be formed in the sliding contact bearing.

Certain aspects of the subject matter described here can be implemented as a rotorcraft bearing system. The rotorcraft bearing system includes a bearing housing attached to an elastomeric bearing on a longitudinal axis, an end surface of the elastomeric bearing attached to an end surface of the bearing housing. The rotorcraft bearing system also includes a sliding contact bearing having an end surface attached to a sliding contact bearing material layer, wherein, under load on the longitudinal axis, the end surface of the sliding contact bearing is configured to contact an opposing end surface of the bearing housing through the sliding contact bearing material layer to form a rotational slip joint.

This, and other aspects, can include one or more of the following features. The opposing end surface of the bearing housing can include a polished surface. The sliding contact bearing material can include at least one of tetrafluoroethylene (TFE), PEEK, or brass. The opposing end surface of the bearing housing and the end surface of the sliding contact bearing can be the same material. The rotorcraft bearing system can also include a retaining member attached to the bearing housing and the sliding contact bearing to prevent the bearing housing and the sliding contact bearing from separating when the load on the longitudinal axis is removed. The retaining member can include a retaining ring and a hook member attached to the retaining ring, the hook member configured to be received by a recess in the bearing housing.

Certain aspects of the subject matter described here can be implemented as a rotorcraft bearing system. The rotorcraft bearing system includes a sliding contact bearing and a bearing housing attached to an elastomeric bearing on a longitudinal axis, a first end surface of the elastomeric bearing attached to an end surface of the bearing housing, a second end surface of the elastomeric bearing attached to a sliding contact material layer, wherein, under load on the longitudinal axis, a surface of the sliding contact material layer is configured to contact an opposing end surface of the sliding contact bearing through the sliding contact material layer to form a rotational slip joint.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes a bearing with a rotation slip joint for a rotorcraft.

In some rotorcraft, each rotor blade is attached to a blade grip that is coupled to a yoke. Each coupling between the yoke and the blade grip includes one or more bearings that allow the pitch of the blade to be adjusted. During rotation, each rotor blade can experience significant load along its pitch axis due to centrifugal force. In some cases, each blade-yoke coupling includes a centrifugal force bearing (CF bearing) that transfers the centrifugal load from the blade to the yoke. The CF bearing withstands the centrifugal load while allowing some degree of pitch-axis blade rotation. During flight, the pitching blades can impart a significant steady torsional strain on the CF bearing that can deform or weaken the bearing. If the blades are folded for storage as in a tiltrotor aircraft, a CF bearing can experience damaging torsional loads during the folding operation. Furthermore, if the blades remain folded for a long time, the CF bearing can be deformed or weakened due to steady strain.

This disclosure describes a CF bearing with a rotation slip joint for a rotorcraft. The CF bearing can be used in the coupling between a rotor blade and the yoke. The CF bearing includes a rotation slip joint coupled to an elastomeric bearing along the axis of centrifugal force such that the rotation slip joint is able to allow rotation of the entire elastomeric bearing relative to the yoke. In this manner, the entire elastomeric bearing rotates on the rotation slip joint to reduce torsional strain within the elastomeric bearing, for example due to blade pitching during flight. In some implementations, the rotation slip joint is a sliding contact bearing including a sliding contact bearing material layer that slides against an essentially smooth surface (for example, a polished metal surface). The sliding contact bearing material can be a frictional material such that the rotation slip joint has some frictional resistance when under a centrifugal load but little or no frictional resistance when no load is present. During rotor operation the rotation slip joint keeps the elastomeric bearing substantially rigid relative to the yoke but allows some amount of rotation. In some implementations, the sliding contact bearing material layer can separate from the essentially smooth surface when no load is present. For example, when the blades are folded as in a tiltrotor aircraft, the rotation slip joint can reduce torsional strain in the elastomeric bearing by allowing the bearing to rotate. In some implementations, the sliding contact bearing material layer separates from the smooth surface when no centrifugal load is present. In this situation, the CF bearing will be uncoupled between the yoke and the blade and the elastomeric bearing will experience little strain. In this manner, the rotation slip joint can reduce steady strain if the blades are stored in the folded configuration for a long period of time.

The CF bearing with rotation slip joint can be used in applications where a centrifugal force bearing is used. For example, the CF bearing could be used in aircraft, rotorcraft, or tiltrotor aircraft. For example, the CF bearing could be included in the coupling between the rotor blades and the yoke.

Figure 1:
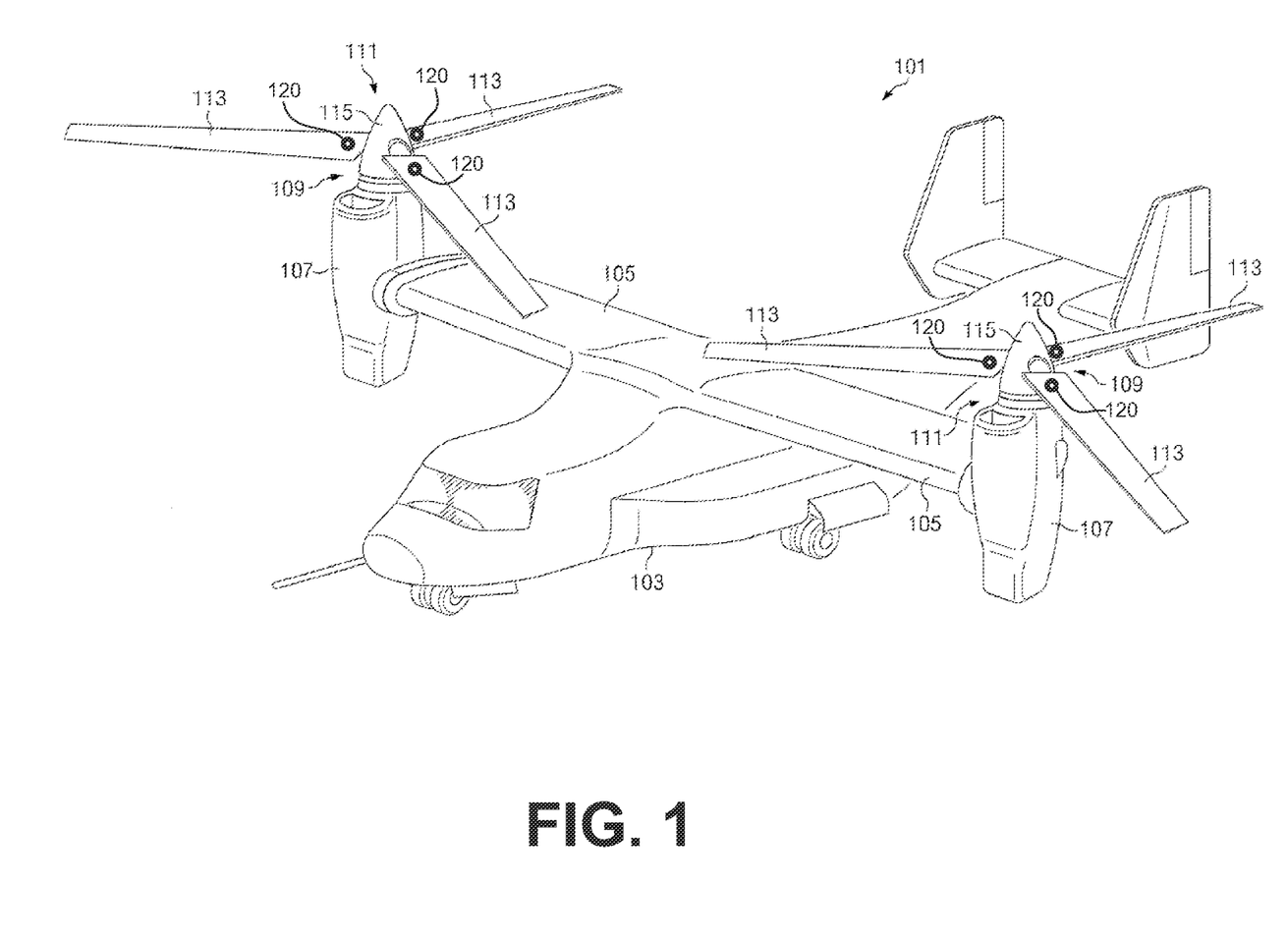
FIG. 1 is a schematic diagram showing an example of a tiltrotor aircraft.

FIG. 1 is a schematic diagram of an example tiltrotor aircraft 101. Aircraft 101 includes a fuselage 103 with attached wings 105. Nacelles 107 are carried at the outboard ends of wings 105 and are rotatable between the helicopter-mode position shown and a forward-facing airplane-mode position (not shown). Nacelles 107 carry engines and transmissions 109 for powering rotor systems 111 in rotation. An engine may be an internal combustion engine, an electrical power source and associated motor, or any other suitable means for powering rotor system 111. Each rotor system 111 is illustrated as having three blades 113. Spinning covers 115 and nacelles 107 substantially enclose transmission 109, obscuring transmission 109 from view in FIG. 1. The tiltrotor aircraft 101 can include CF bearing assemblies 120 as part of the coupling between each blade 113 and the rotor systems 111.

Figure 2:
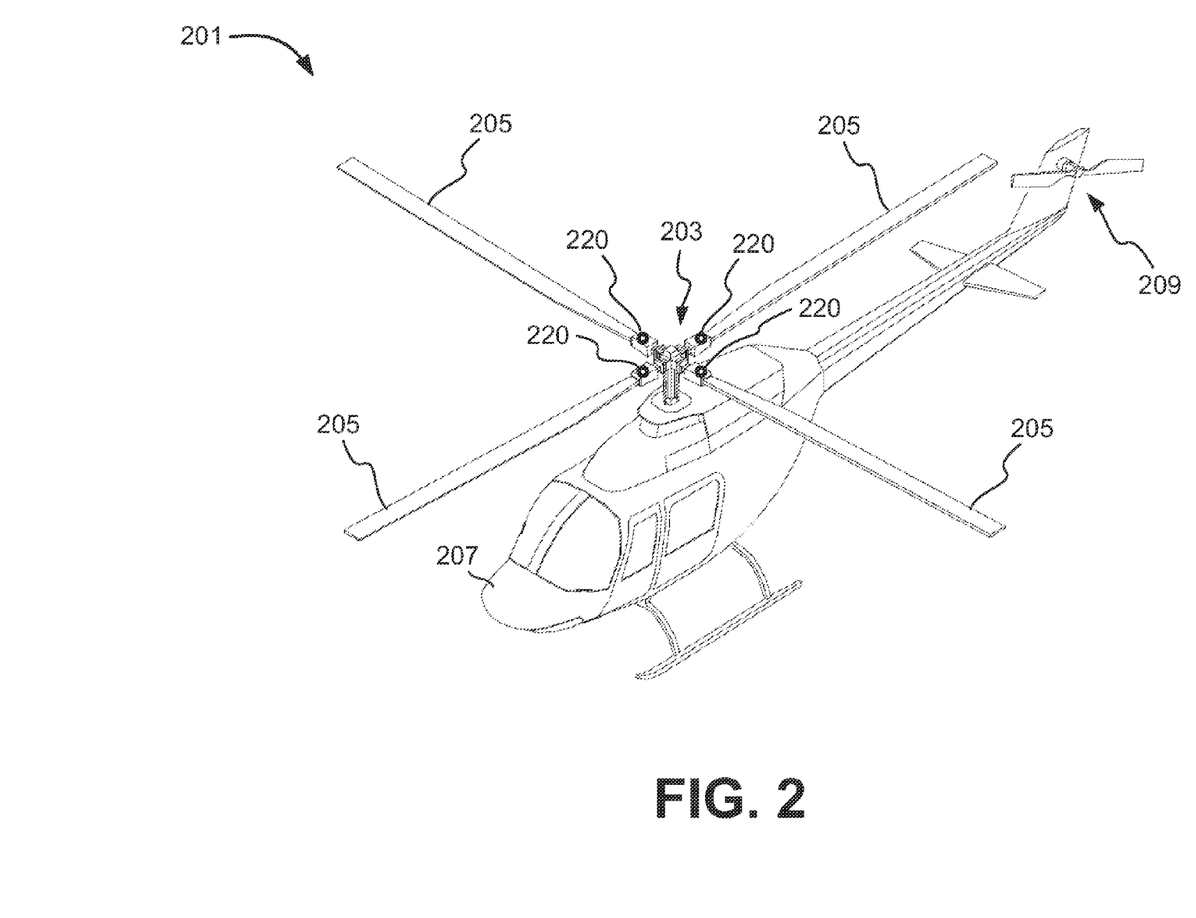
FIG. 2 is a schematic diagram showing an example of a rotorcraft.

FIG. 2 is a schematic diagram of an example rotorcraft 201. Rotorcraft 201 has a rotor system 203 with multiple rotor blades 205. The pitch of each rotor blade 205 can be manipulated in order to selectively control direction, thrust, and lift of rotorcraft 201. The rotorcraft 201 can include CF bearing assemblies 220 as part of the coupling between each blade 205 and the rotor system 203.

Figure 3:
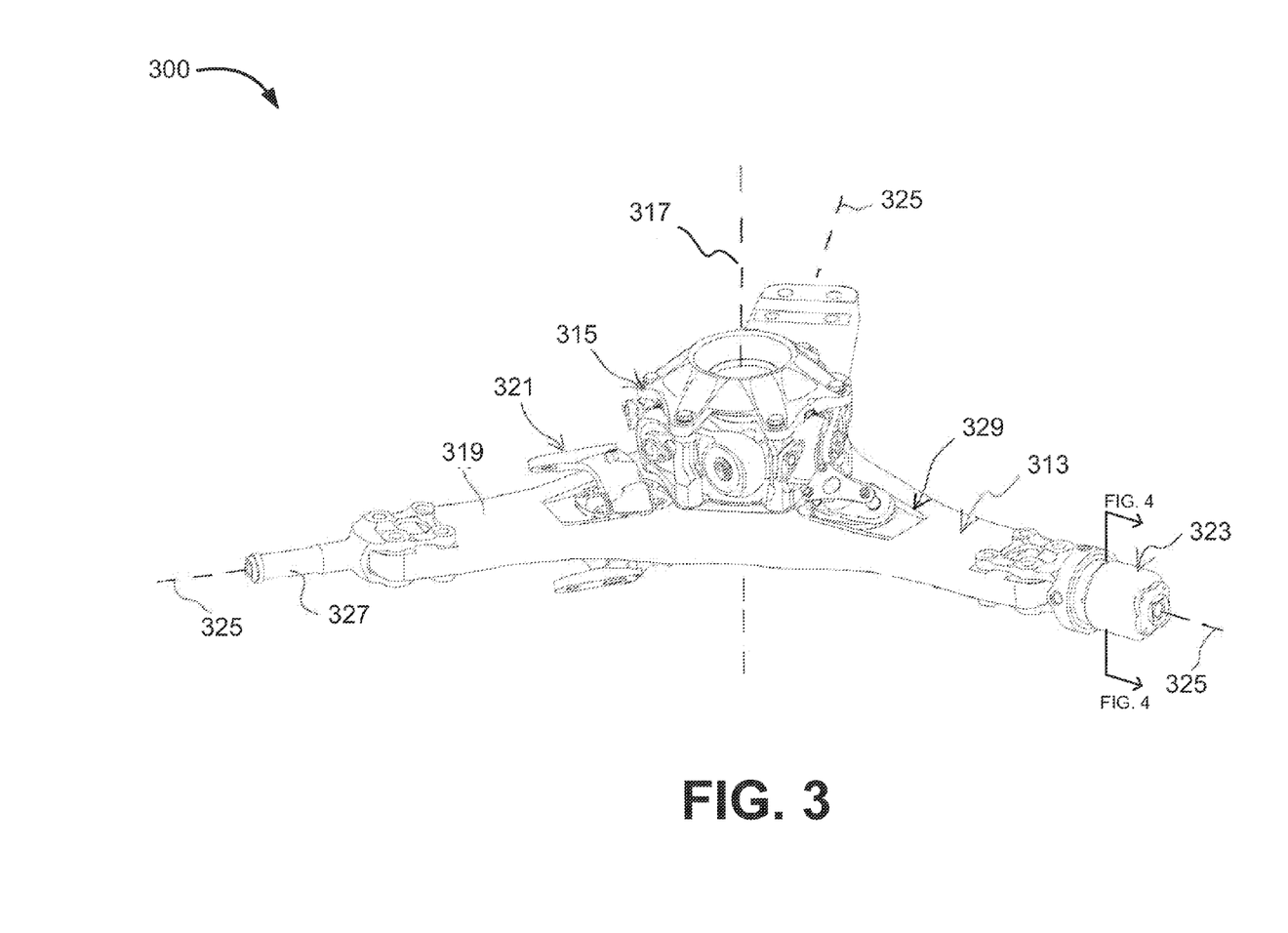
FIG. 3 is a schematic diagram showing an example of a rotor assembly including a centrifugal bearing assembly.

FIG. 3. is a schematic diagram of an example rotor assembly 300. The rotor assembly 300 can be included in the rotor systems 111 described in FIG. 1 or in the rotor system 203 described in FIG. 2. The rotor assembly 300 includes an example yoke 313 and a central hub assembly 315. Hub assembly 315 is used to pivotally attach yoke 313 to a mast (not shown), allowing the mast to rotate rotor assembly 300 about mast axis 317. In the example shown, hub 315 allows for yoke 313 to gimbal about flapping axes relative to the mast.

Example yoke 313 includes multiple arms 319 extending radially outward from a central portion of yoke 313. Example yoke 313 has three arms 319, but in other implementations yoke 313 can include more or fewer arms 319. Each arm 319 connects a blade assembly (not shown) to yoke 313 for rotation with yoke 313 about mast axis 317. Each blade assembly includes a blade (not shown) that attaches to a blade grip (not shown) that attaches to each arm 319 at an inboard pitch-change bearing assembly 321 and at an outboard CF bearing assembly 323. Bearing assemblies 321, 323 define a longitudinal pitch axis 325 for each blade assembly about which the blade assemblies may be rotated to adjust the pitch of the blades. Each CF bearing assembly 323 is carried on a spindle 327 that is connected to an outboard end of each arm 319 of yoke 313, whereas each inboard bearing assembly 321 is carried in a cavity 329 formed in an inboard portion of each arm 319.

Figure 4:
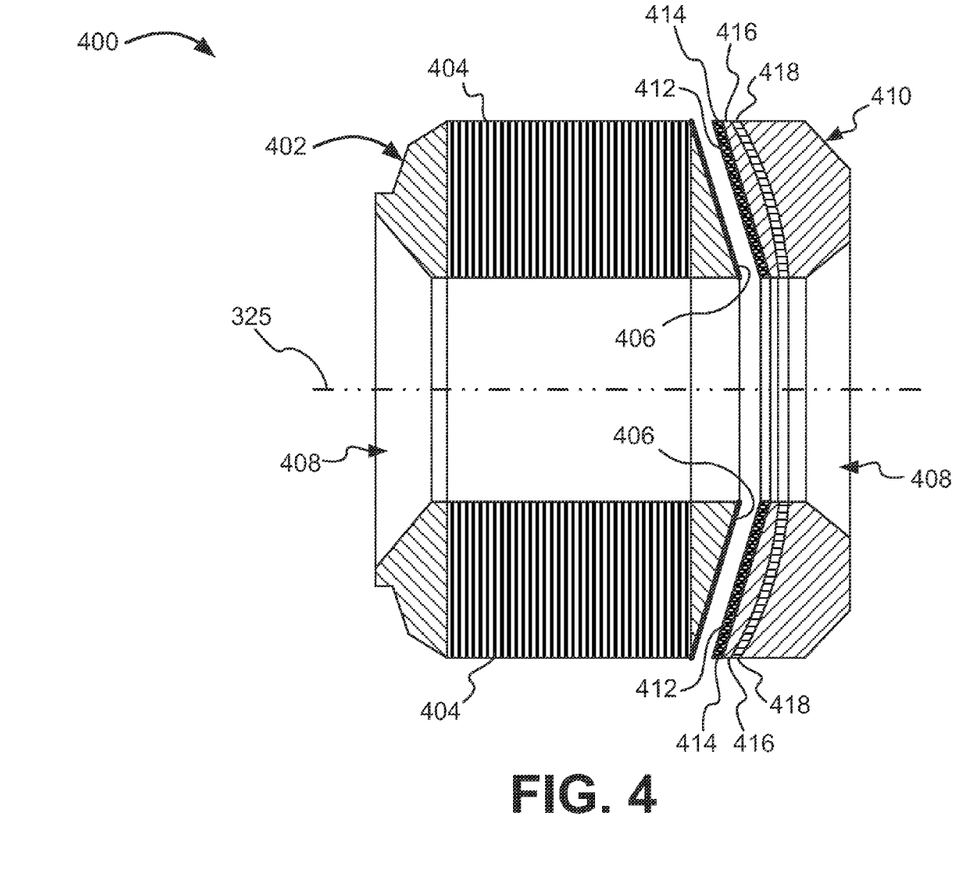
FIG. 4 is a schematic diagram showing a cross-section of an example of a centrifugal bearing assembly.

FIG. 4 is a schematic diagram of a cross-section of an example CF bearing assembly 400. The CF bearing assembly 400 can be used in applications such as bearing assembly 120 in FIG. 1, bearing assembly 220 in FIG. 2, or bearing assembly 323 in FIG. 3. The example CF bearing assembly 400 includes a bearing housing 402 and a sliding contact bearing 410. The bearing housing 402 and the sliding contact bearing 410 are located adjacently along longitudinal axis 325. Longitudinal axis 325 is the axis of centrifugal loading during rotor operation. The bearing housing 402 and the sliding contact bearing 410 surround and define a spindle hole 408. The spindle hole 408 is the hole through which a spindle (e.g. spindle 327 from FIG. 3) is located. The bearing housing 402 can be attached to a blade (e.g. via a blade grip). The sliding contact bearing 410 is fixedly attached to the spindle. In some implementations, the sliding contact bearing 410 can be independently removed from the CF bearing assembly 400. For example, the sliding contact bearing 410 could be removed for inspection or replacement while the rotor blades are in the folded position while the bearing housing 402 remains attached to the blade.

An end surface of the bearing housing 402 is attached to an end surface of an elastomeric bearing 404. The elastomeric bearing 404 can be a suitable elastomeric bearing, thrust bearing, or centrifugal force bearing. For example, elastomeric bearing 404 can include a stacked arrangement of shims and elastomeric. The bearing housing 402 can be all or partly a metal such as steel, titanium, aluminum, or another metal. The bearing housing 402 can also be all or partly a non-metallic material such as plastic.

The sliding contact bearing 410 includes a contact bearing material layer 414 that is attached to an end surface 412 of the sliding contact bearing 410. In some implementations, the contact bearing material layer 414 can have a conical shape or another shape. The end surface 412 of the sliding contact bearing 410 and an opposing end surface 406 of the bearing housing 402 are shaped to mate with each other. In some implementations, the sliding contact bearing 410 includes a polymer layer 418. The polymer layer 418 can be a material such as a polymer, rubber, an elastomer, or another material. The polymer layer 418 can be located between the contact bearing material layer 414 and the end surface of the sliding contact bearing 410. In some implementations, the polymer layer 418 has a partly spherical shape. A transition shim 416 is located between the contact bearing material layer 414 and the polymer layer 418. The transition shim 416 can be metal or another material, and can have a conical shape on a surface contacting the contact bearing material layer 414 and a partly spherical shape contacting the polymer layer 418.

When no load is present along longitudinal axis 325, the end surface 412 of the sliding contact bearing 410 does not impinge on the opposing end surface 406 of the bearing housing. In some situations with no load, the end surface 412 of the sliding contact bearing 410 may not be in contact with the opposing end surface 406 of the bearing housing 402. As such, with little or no load present the bearing housing 402 is able to rotate along the axis 325 with respect to the sliding contact bearing 410.

When a load is present along longitudinal axis 325, the end surface 412 of the sliding contact bearing 410 impinges on the opposing end surface 406 of the bearing housing 402. In this manner, the end surface 412 and the opposing end surface 406 form a rotational slip joint. The bearing housing 402 is able to rotate along the axis 325 with respect to the sliding contact bearing 410. However, friction in the rotational slip joint between the end surface 412 and the opposing end surface 406 can reduce the speed or degree of rotation of the bearing housing 402 relative to the sliding contact bearing 410.

The opposing end surface 406 of the bearing housing 402 can be an essentially smooth surface such as polished metal. The end surface 412 of the sliding contact bearing 410 is the end surface of the contact bearing material layer 414. The contact bearing material layer 414 can be a frictional material. For example, the frictional material can have a friction coefficient in the range of 0.01 to 0.40. For example, the sliding contact bearing material could be tetrafluoroethylene (TFE), PEEK, brass, or another material. In some implementations, the opposing end surface 406 of the bearing housing 402 and the end surface 412 of the sliding contact bearing 410 are the same material.

Figure 5:
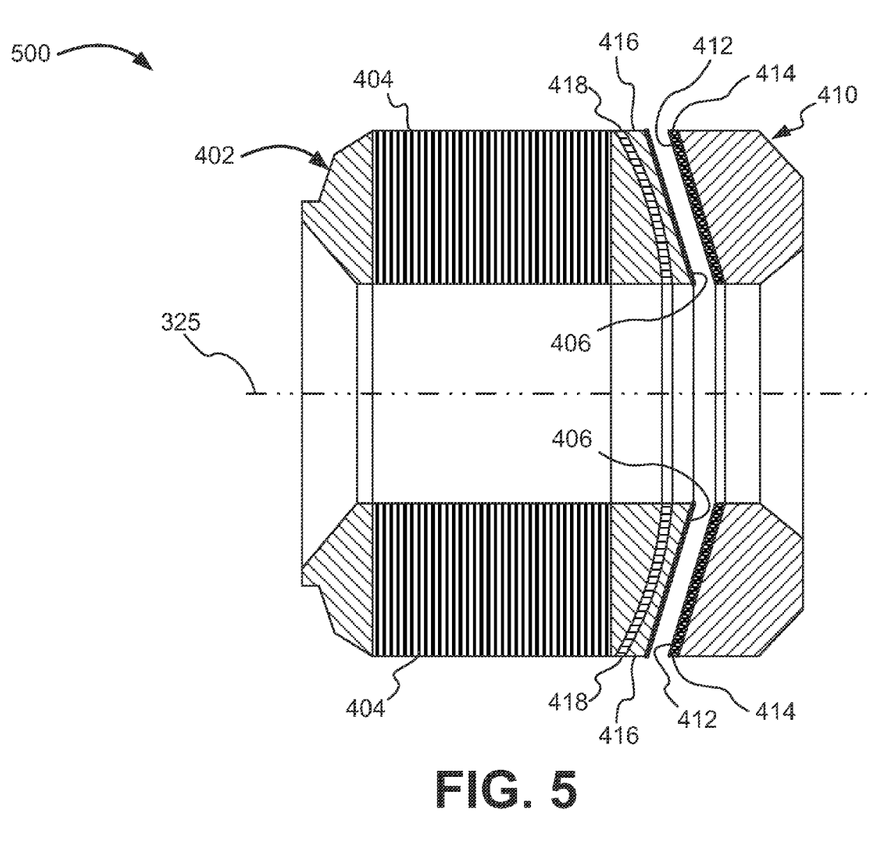
FIG. 5 is a schematic diagram showing a cross-section of another example of a centrifugal bearing assembly.

FIG. 5 is a schematic diagram of a cross-section of an example CF bearing assembly 500. Example CF bearing assembly 500 is substantially similar to CF bearing 400 shown in FIG. 4. In CF bearing assembly 500, a polymer layer 418 is located between the elastomeric bearing 404 and the opposing end surface 406 of the bearing housing 402. A transition shim 416 can be included between the polymer layer 418 and the opposing end surface 406. In this example implementation, the sliding contact bearing 410 does not include a polymer layer 418. Including the polymer layer 418 on the bearing housing 402 and not the sliding contact bearing 410 allows the sliding contact bearing 410 to be subjected to higher temperatures than the polymer layer 418 can withstand. For example, the sliding contact bearing material 414 could be TFE, which can require high temperatures during the application process that may damage the polymer layer 418. In some implementations, the sliding contact bearing material is attached to the opposing end surface 406 of the bearing housing 402 and the essentially smooth surface (i.e. the polished surface) is attached to the end surface 412 of the sliding contact bearing 410. In some implementations, the opposing end surface 406 of the bearing housing 402 and the end surface 412 of the sliding contact bearing 410 are the same material.

Figure 6:
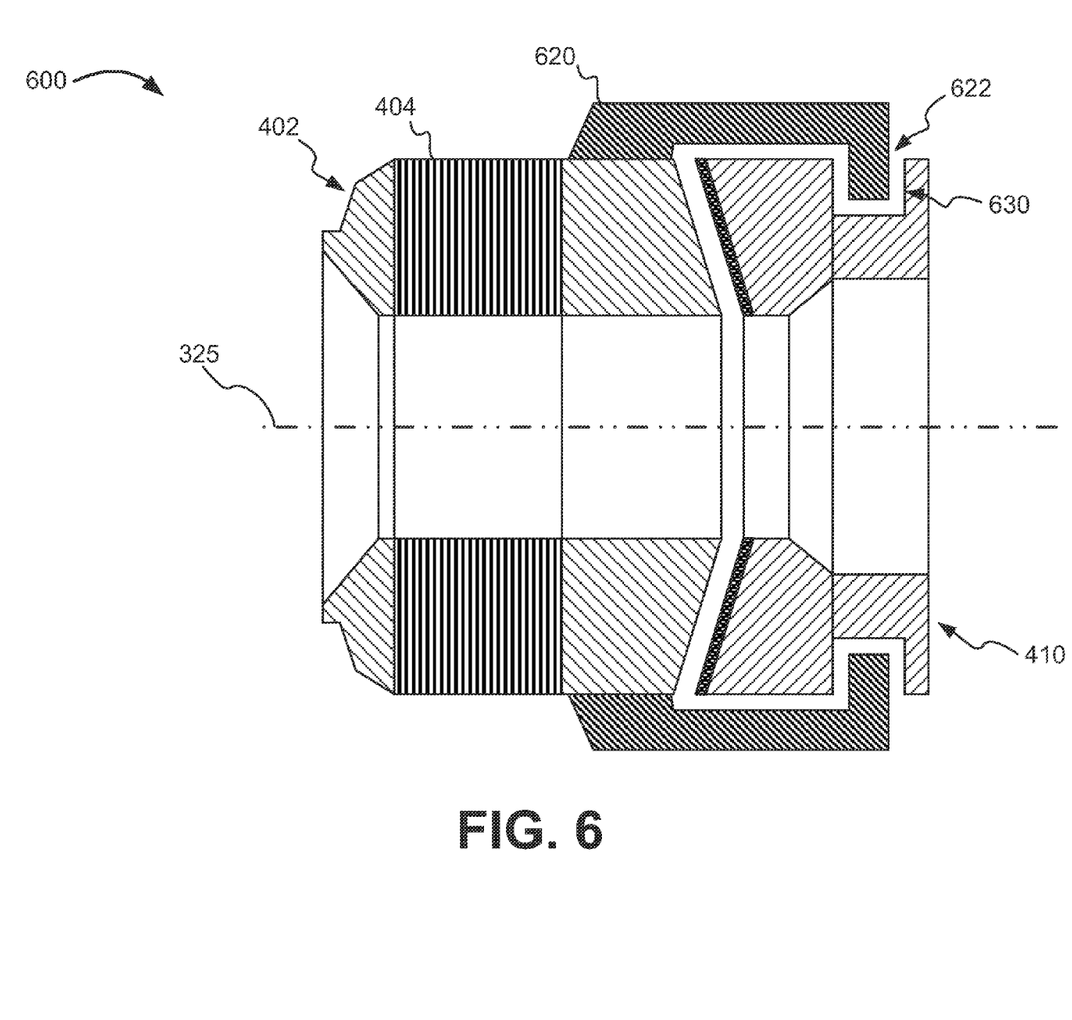
FIG. 6 is a schematic diagram showing a cross-section of an example of a centrifugal bearing assembly including a retaining ring.

FIG. 6 is a schematic diagram of a cross-section of an example CF bearing assembly 600. Example CF bearing assembly 600 is substantially similar to CF bearing 400 shown in FIG. 4 and CF bearing 500 shown in FIG. 5. Example CF bearing 600 includes a retaining ring 620 and a recess 630. The retaining ring 620 is cylindrical member attached to the bearing housing 402 that includes a hook member 622. The hook member 622 is a flange that extends radially inward. The retaining ring 620 or the hook member 622 can extend partially or entirely around the bearing housing 402. The sliding contact bearing 410 includes a recess 630 in the outer surface of the bearing 410. The recess 630 is configured to receive the hook member 622 of the retaining ring 620. The recess 630 limits the movement of the hook member 622 along the axis 325 relative to the recess 630. Thus, the relative separation of the bearing housing 402 and the sliding contact bearing 410 is limited. The retaining ring 620 and recess 630 prevent the bearing housing 402 and the sliding contact bearing 410 from separating when the load on the longitudinal axis 325 is removed. In this manner, the CF bearing assembly 600 is prevented from separating into two pieces (i.e., the bearing housing 402 and the sliding contact bearing 410) when no load is present.

A flange can extend radially outward from the sliding contact bearing 410 to limit movement of the hook member 622. In some implementations, the retaining ring 620 is attached to the sliding contact bearing 410 and the recess 630 is in the bearing housing 402.

A number of implementations have been described. Nevertheless, it will be understood that various modifications may be made without departing from the spirit and scope of the disclosure.

What is claimed is:

1. A rotorcraft bearing system comprising:
   a bearing housing attached to an elastomeric bearing on a longitudinal axis, an end surface of the elastomeric bearing attached to an end surface of the bearing housing;
   a sliding contact bearing having an end surface; and
   an intermediate sliding contact bearing material on the end surface of the sliding contact bearing, wherein, under no load on the longitudinal axis, the intermediate sliding contact bearing material is untouched by the bearing housing, and wherein, under load on the longitudinal axis, the intermediate sliding contact bearing material is configured to touch an opposing end surface of the bearing housing to form a rotational slip joint.

2. The rotorcraft bearing system of claim 1, wherein the opposing end surface of the bearing housing includes a polished surface.

3. The rotorcraft bearing system of claim 2, wherein the intermediate sliding contact bearing material is attached to the end surface of the sliding contact bearing.

4. The rotorcraft bearing system of claim 1, wherein the end surface of the sliding contact bearing includes a polished surface.

5. The rotorcraft bearing system of claim 4, wherein the intermediate sliding contact bearing material is attached to the opposing end surface of the bearing housing.

6. The rotorcraft bearing system of claim 1, wherein the sliding contact bearing material includes a frictional material.

7. The rotorcraft bearing system of claim 6, wherein the sliding contact bearing material includes at least one of tetrafluoroethylene (TFE), PEEK, or brass.

8. The rotorcraft bearing system of claim 1, further comprising an intermediate polymer layer between the intermediate sliding contact bearing material layer and the elastomeric bearing.

9. The rotorcraft bearing system of claim 8, wherein the intermediate polymer layer includes rubber.

10. The rotorcraft bearing system of claim 8, wherein the intermediate polymer layer is attached to and touches the end surface of the bearing housing.

11. The rotorcraft bearing system of claim 1, further comprising a retaining member attached to the bearing housing and configured to couple with the sliding contact bearing to prevent the bearing housing and the sliding contact bearing from separating when the load on the longitudinal axis is removed.

12. The rotorcraft bearing system of claim 11, wherein the retaining member comprises:
   a retaining ring; and
   a hook member attached to the retaining ring, the hook member configured to be received by a recess in the bearing housing.

13. The rotorcraft bearing system of claim 12, wherein the retaining ring is attached to the bearing housing.

14. The rotorcraft bearing system of claim 1, wherein the bearing housing and the sliding contact bearing surround and define a spindle hole configured to receive a spindle.

15. A rotorcraft bearing system comprising:
   a bearing housing attached to an elastomeric bearing on a longitudinal axis, an end surface of the elastomeric bearing attached to an end surface of the bearing housing; and
   a sliding contact bearing having an end surface attached to and touching a sliding contact bearing material, wherein, under no load on the longitudinal axis, the end surface of the sliding contact bearing is configured to define a gap between the sliding contact bearing and the bearing housing, and the bearing housing is configured to be untouched by the sliding contact bearing material, and wherein, under load on the longitudinal axis, the end surface of the sliding contact bearing is configured to contact an opposing end surface of the bearing housing through the sliding contact bearing material layer to form a rotational slip joint.

16. The rotorcraft bearing system of claim 15, wherein the opposing end surface of the bearing housing includes a polished surface.

17. The rotorcraft bearing system of claim 15, wherein the sliding contact bearing material includes at least one of tetrafluoroethylene (TFE), PEEK, or brass.

18. The rotorcraft bearing system of claim 15, wherein the opposing end surface of the bearing housing and the end surface of the sliding contact bearing are the same material.

19. The rotorcraft bearing system of claim 15, further comprising a retaining member attached to the bearing housing and configured to couple with the sliding contact bearing to prevent the bearing housing and the sliding contact bearing from separating when the load on the longitudinal axis is removed wherein the retaining member comprises:
   a retaining ring; and
   a hook member attached to the retaining ring, the hook member configured to be received by a recess in the bearing housing.

20. A rotorcraft bearing system comprising:
   a sliding contact bearing, wherein a first end surface of the sliding contact bearing touches a sliding contact material; and
   a bearing housing attached to an elastomeric bearing on a longitudinal axis, a first end surface of the elastomeric bearing attached to a first end surface of the bearing housing, wherein, under no load on the longitudinal axis, the sliding contact material is spaced apart from the second end surface of the sliding contact bearing housing to define a gap between the bearing housing and the material, and under load on the longitudinal axis, the sliding contact material is configured to touch the second end surface of the bearing housing to form a rotational slip joint.

\* \* \* \* \*